United States Patent [19]
McCall et al.

[11] Patent Number: 5,482,329
[45] Date of Patent: Jan. 9, 1996

[54] PIPE ADAPTOR AND INSTALLING DEVICE

[76] Inventors: Delmar L. McCall, P.O. Box 357, Cotati, Calif. 94931; Donald P. Millerick, 3619 Banyan St., Santa Rosa, Calif. 95403; Jeffery T. Millerick, 420 Lincoln Ave., Cotati, Calif. 94931

[21] Appl. No.: 65,980

[22] Filed: May 21, 1993

[51] Int. Cl.$^6$ .................................................. F16L 41/14
[52] U.S. Cl. ........................... 285/39; 285/161; 285/221; 285/206; 285/193; 137/318
[58] Field of Search ............................. 285/221, 46, 192, 285/193, 161, 424, 206, 39, 40; 137/359, 360, 317, 318

[56] References Cited

U.S. PATENT DOCUMENTS

| | | | |
|---|---|---|---|
| 810,168 | 1/1906 | Mueller | 285/193 |
| 1,153,282 | 9/1915 | Zahm | 285/161 X |
| 1,159,685 | 11/1915 | Killefer | 285/193 X |
| 1,212,797 | 1/1917 | Mueller et al. | |
| 1,214,220 | 1/1917 | Regar | |
| 1,319,817 | 10/1919 | Wells | |
| 1,618,720 | 2/1927 | Moore | 285/192 X |
| 2,302,273 | 11/1942 | Sutton | |
| 2,966,814 | 1/1961 | Mueller et al. | 137/318 |
| 3,477,745 | 11/1969 | Williams et al. | 285/40 |
| 3,615,108 | 10/1971 | Toth | 285/46 |
| 3,726,545 | 4/1973 | Grim et al. | 285/201 X |
| 4,385,777 | 5/1983 | Logsdon | 285/12 |
| 4,491,124 | 1/1985 | Goettel | 285/424 X |
| 4,682,624 | 7/1987 | Turner | 137/317 |
| 5,105,844 | 4/1992 | King, Sr. | 137/318 |
| 5,199,145 | 4/1993 | McMillan et al. | 285/197 X |
| 5,230,536 | 7/1993 | Rider et al. | 285/192 X |

Primary Examiner—Eric K. Nicholson
Assistant Examiner—Heather Chun Shackelford
Attorney, Agent, or Firm—Corwin R. Horton

[57] ABSTRACT

An adaptor for extending a pipe through a barrier and securing the pipe therein which comprises a pipe segment having a leading end for insertion through the barrier and a trailing end to remain at the insertion side of the barrier upon insertion of the adaptor, each end being adapted to receive a pipe fitting. The leading end is provided with peripheral cutting teeth for boring a hole through and thereby penetrating the barrier upon rotation of the pipe around its longitudinal axis. An externally threaded section along the pipe is sized and configured to be self-threaded though the hole bored by the penetration end to secure the pipe therein and a stop is located toward the trailing end from the threaded section to engaging the outer surface of the barrier to stop further penetration of the adaptor. An installation tool which may be rotationally driven by a hand drill is also provided. The tool holds the adaptor at the trailing end for rotation of the adaptor for drilling the hole and insertion of the adapter. The tool mounts a drill bit coaxially with the adaptor with the drill bit extending forward through the bore of the adaptor beyond the leading end thereof for drilling a pilot hole as a guide for drilling of the larger hole concentric therewith by the adaptor.

7 Claims, 4 Drawing Sheets

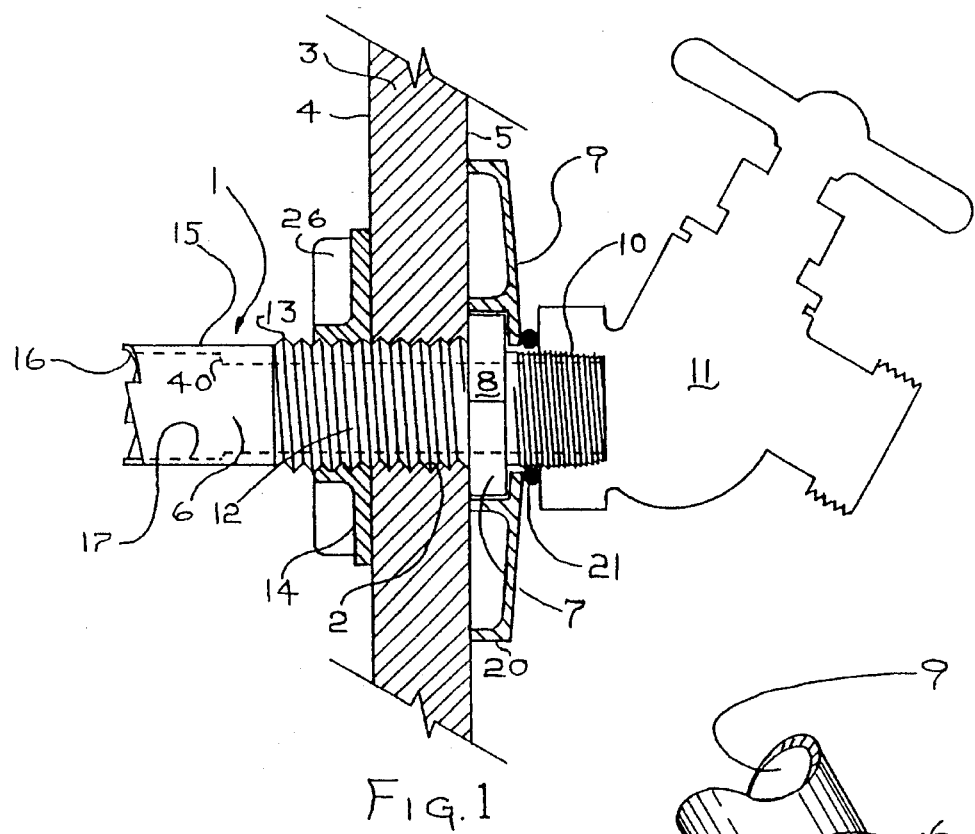
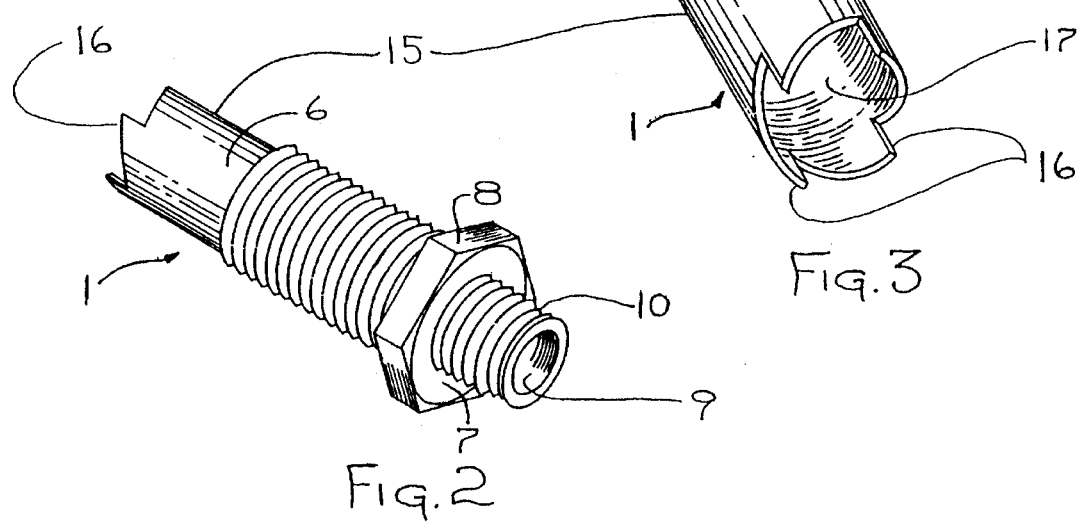

PIPE ADAPTOR AND INSTALLING DEVICE

BACKGROUND OF THE INVENTION

This invention relates to adaptors for securing a pipe extending through a wall, mounting bracket or the like and to tools for installing such adaptors. Conventionally, when it is desired to extend a pipe, such for water, gas or other fluid, through a wall or other barrier, a hole is first bored through the barrier to receive a pipe and one end of a pipe section or adaptor is then inserted through the hole to cross the barrier. It is frequently desirable to fix the pipe in the barrier against movement, particularly where a faucet or other device is mounted on a pipe end at one side of the barrier. This is then typically effected by use of an adaptor consisting of a pipe section which is inserted in the hole. The pipe section is then fixed by annular flanges or the like secured to the pipe at either side of the barrier, typically by threaded connections with the pipe. After the adaptor is secured, piping and/or other appropriate implements, such as a faucet, are then connected at either end of the adaptor.

This operation is inherently inefficient as it requires a number of separate operations. Additionally, to secure the pipe in this fashion it is usually necessary for the installer to move from one side of the barrier to the other to complete the operation, which is frequently inconvenient and time consuming.

SUMMARY OF THE INVENTION

The invention relates to adaptors for securing a pipe extending through a wall or the like of the general type described provided with means for fixing the pipe in the barrier against movement, particularly in the direction through the barrier. In accordance with the present invention a hole for the pipe may be drilled and a pipe section is inserted in the hole and secured all in a single continuous operation from only one side of the barrier with an adaptor advantageously of unitary construction.

The adapters of this invention comprise a pipe segment having a leading end for insertion through the barrier and a trailing end to remain at the insertion side of the barrier upon insertion of the adaptor, each end being adapted to receive a pipe fitting. The leading end is provided with peripheral cutting teeth for boring a hole through and thereby penetrating the barrier upon rotation of the pipe around its longitudinal axis.

As another feature of this invention, an externally threaded section is provided along the pipe and is sized and configured to be self-threaded though the hole bored by the penetration end to secure the pipe therein. That is, the threads are provided with a pitch and depth that will draw the threaded section of the mounting device fully into the hole to secure it from movement in the direction through the hole. Additionally, a stop is located toward the trailing end from the threaded section to engage the outer surface of the barrier to stop further penetration of the adaptor.

As yet another feature of this invention a novel installation tool is provided for installation of the adaptor. This tool is adapted to hold one end of the adaptor for rotation thereof for drilling the hole and insertion of the adapter into the hole by means of the self-tapping threads. The installation tool is adapted to be rotationally driven by a hand drill. The tool holds and supports the adaptor from the trailing end for rotation of the adaptor for drilling the hole and insertion of the adapter. Such support includes a central projection on the tool that is received into the bore of the adaptor. Advantageously, this tool mounts a drill for drilling a pilot hole as a guide for drilling of the larger hole concentric therewith by the adaptor. An axial bore is provided in the tool extending in the leading direction through the central projection support that is coaxial with the adaptor mounted thereon. The drill bit extends through this bore and then forward through the bore of the adaptor beyond the leading end thereof for drilling a pilot hole as a guide for drilling of the larger hole concentric therewith by the adaptor.

BRIEF DESCRIPTION OF THE DRAWINGS

FIG. 1 is a sectional view of an embodiment of the adaptor of the present invention mounted in a wall, secured in place by a jamb nut at one side of the wall and bearing an escutcheon and a faucet at the other side;

FIG. 2 is an isometric view of the adaptor of FIG. 1;

FIG. 3 is a fragmentary isometric view of the adaptor of FIG. 2 taken from the opposite end;

DETAILED DESCRIPTION OF THE PREFERRED EMBODIMENT

Figure 4:
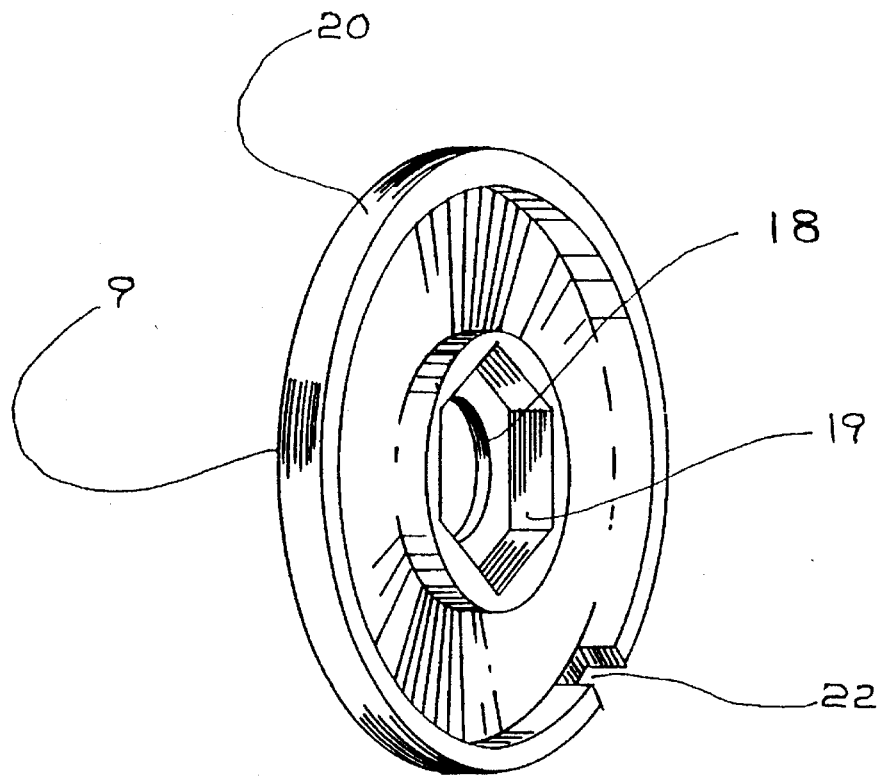
FIG. 4 is an isometric view of the escutcheon shown in FIG. 1.

The following description illustrates the manner in which the principles of the invention are applied but is not to be construed as limiting the scope of the invention.

Referring to FIG. 1 of the drawings, reference numeral 1 generally indicates an adaptor of this invention which extends through a hole 2 in wall 3 having an inner surface 4 and outer surface 5. Adaptor 1 is of unitary construction, of brass or other suitable material, and comprises a pipe segment 6 having an annular flange 7 at an intermediate position along the length thereof. Flange 7 is located adjacent the outer surface of the wall when installed and acts as a stop against further inward movement of adaptor 1 through hole and as a seal for the hole 2 at the outer surface 5 of wall 3. The outer periphery 8 of flange 7 is hexagonal or of other ridged configuration for cooperation with an installation tool for the adaptor as will be described and for mounting an on adaptor 1 at the outer surface 5 of wall 3. A central bore 9 extends the length of pipe 6 for fluid flow and accomodating terminal connectors. A terminal portion 10 of pipe segment 6 extends from flange 7 in the direction outward of wall 3. Terminal portion 10 is suitably sized and threaded, as shown, to form a male connector for receiving the female connector of a faucet 11 or other desired fitting, including further piping. Alternatively, terminal portion 10 may constitute a female connection by appropriately sizing and configuring the bore therethrough, e.g. with internal threads, to receive a male pipe connection.

Extending along pipe segment 6 from flange 7 inwardly into and though hole 2 is a threaded section 12 bearing exterior threads 13. Threaded section 12 serves to engage the sides of hole 2 to secure the adaptor against movement through the hole in either direction. Threaded section extends a distance beyond the inner surface 4 of wall 3 to receive an internally threaded jamb nut 14 that is tightened against the inner 4 surface of wall 3 to further secure adaptor 1 against movement.

As best seen in FIGS. 2 and 3, extending from threaded section 12 in the direction distant from wall 3 is terminal portion 15 of pipe segment 6. The terminal end of terminal portion 15 is provided with cutting teeth 16 around its periphery and projecting in the terminal direction. Teeth 16 are adapted for cutting a hole in the wall or other desired barrier upon rotation of adaptor 1 about its longitudinal axis. The outer diameter of terminal portion 15 is smaller than the diameter at threaded section 12, taken at the crest of threads 13 (crest diameter), and is desirably about the same diameter as that of section 12, taken at the root of threads 13 (root diameter).

Terminal portion 15 is also adapted for connection to piping or other fittings after installation of adaptor 1. As illustrated in this embodiment, a terminal portion 17 of bore 9 located at terminal portion 15 is sized for receiving conventional copper pipe for producing a conventional soldered pipe joint. Alternatively, bore portion 17 may be internally threaded to receive a threaded pipe end or the outer diameter of terminal portion 15 may be sized so that it is received by a female pipe connection.

The depth and pitch of threads 13 and the crest diameter relative to the diameter of the hole cut by teeth 15 are all selected, in relation to the types of wall materials or the like with which adaptor 1 will be employed, e.g. gypsum board, fiberboard, plywood, etc., so that threaded section will be self-tapping. That is, threads 13 are configured so that, upon rotation of adaptor 1 about its longitudinal axis, threaded section 12 will be pulled into the hole cut by teeth 16 of terminal portion 15, creating complementary threading in at sides of the hole as it penetrates to secure threaded section 12 in the hole.

As shown in FIG. 4, escutcheon 9 is of generally disk shape bearing a central hole 18 sized to receive terminal portion 10 of adaptor 1 and slide therealong to a position adjacent flange 7 (see FIG. 1). Surrounding hole 18 is a socket 19 configured to receive flange 7 in mating relationship, in this case by its hexagonal shape, so that escutcheon 9 is fixed against rotation relative to adaptor 1. Escutcheon 9 bears a peripheral skirt 20 to rest against the surface of wall 3 upon installation. Escutcheon 9 is held in place by an "O" ring 21 bearing against faucet 11. A slot 22 is provided in skirt 19 for convenience in prying off escutcheon 9 when desired.

Figure 5:
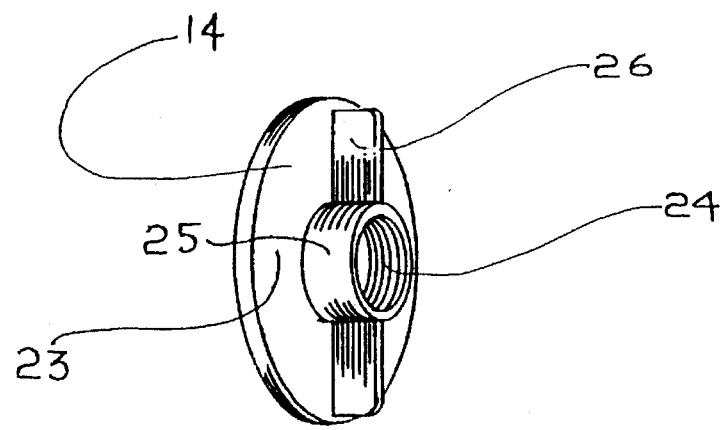
FIG. 5 is an isometric view of the jamb nut shown in FIG. 1.

As shown in FIG. 5, jamb nut 14 comprises a flat circular plate 23 having a central opening 24 with a reinforcing ring 25 at the opening extending to one side of plate 23. Opening 24 is internally threaded to receive threads 13 of threaded section 12 of adaptor 1. Jamb nut 14 bears lugs 26 for hand tightening and loosening thereof.

Figure 6:
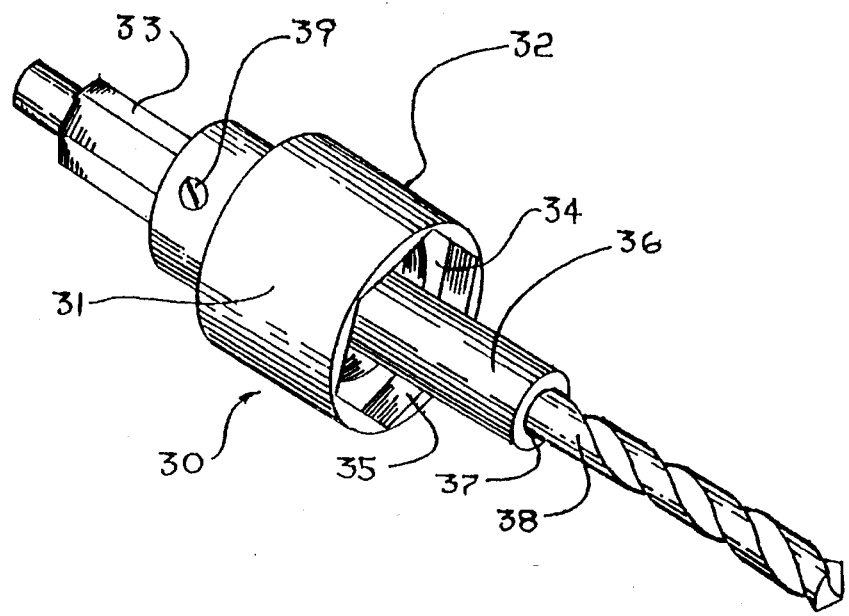
FIG. 6 is an isometric view of an embodiment of the installation tool of the present invention.
Figure 7:
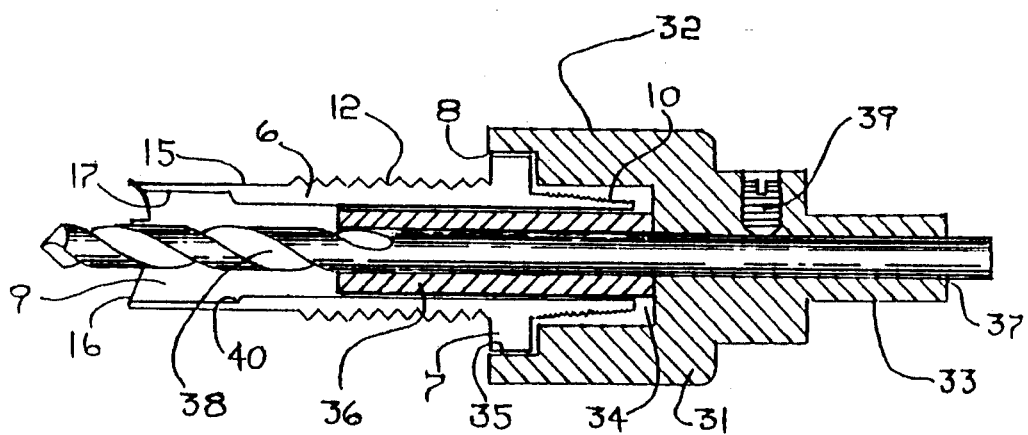
FIG. 7 is a sectional view of the installation tool of FIG. 6 bearing an adaptor of the present invention in position for installation thereof.

Referring now to FIGS. 6 and 7, an embodiment of the installation tool of this invention is generally indicated by reference numeral 30 comprising a chuck 31 which includes a cylindrically-shaped body 32 having a coaxial extension at the rearward end thereof forming a shank 33. Shank 33 is sized to be received, in turn, by the chunk of a conventional hand drill (not shown), and is a hexagonally shaped to facilitate gripping by the hand drill chuck. Chuck body 32 has a central cavity 34 at its forward end shaped to receive both terminal portion 10 of pipe segment 6 and flange 7 of adaptor 1. Cavity or socket 34 includes a hexagonal portion 35 which engages the hexagonal periphery 8 flange 7 to prevent rotation of flange 7, and hence of adaptor 1, relative to chuck 31. A cylindrical support shaft 36 is fixed to chuck body 32 in socket 34, projects forward thereof and is coaxial therewith. Shaft 36 has an outer diameter slightly smaller than the internal diameter of pipe segment 6 of adaptor 1 so that pipe segment 6 may be slidably engaged on shaft 37 to support adaptor 1 during the installation.

A coaxial bore 37 extends through both shaft 36 and chuck body 32 to receive a pilot drill bit 38 with the drilling end thereof extending a short distance forward of the terminal end of terminal portion 15 of adaptor 1. A set screw 39 is provided in chuck body 32 to secure drill bit 38 in this position.

As shown in FIGS. 1 and 7, the diameter of terminal portion 17 of bore 9 is greater than for than for the remaining length of bore 9, thus providing an inner abutment or ledge 40. This provides a thinner wall section at terminal portion 15, thus cutting teeth 16 are thinner, facilitating their cutting action. Additionally, ledge 40 will act both as an abutment for a male connection received in portion 17 and as a stop to prevent the plug cut from the wall by teeth 16 from penetrating further into pipe segment 6, thus facilitating removal of the plug.

For installation in wall 3, adaptor 1 is first mounted on installation tool 30 as described and shank 33 of the installation tool is engaged in the chuck of a hand drill. Using the hand drill, the hole is then started in the wall at the selected installation position with pilot drill and drilling is continued with the terminal portion 15 engaging the wall and drill a hole through the wall in much the same fashion as a conventional hole drill bit. Upon further penetration of adaptor 1 into hole 2 thus formed, threads 13 of threaded section 12 engage the sides of the hole and continued rotation of adaptor 1 with the drill will cause it to be pulled completely into the hole up to flange 7 as shown in FIG. 1. Installation tool 30 is then withdrawn. The plug formed in cutting the hole is retained in terminal portion 15 of pipe segment 6 due to ledge 40 and is then easily pushed out by thrusting a rod or the like through the pipe from the outside.

With adaptor 1 thus secured in the hole, the operator may then move to the inside of wall 3 to apply jamb nut 14 on the exposed portion of threaded section 12 and against inner surface 4 of wall 3 and then to connect terminal portion 15 of pipe segment 6 to service piping or the like as appropriate. Escutcheon 9 is then mounted over terminal portion 10 and against the outer surface 5 of wall 3 and faucet 11 or other desired fitting applied onto terminal portion 10.

Figure 8:
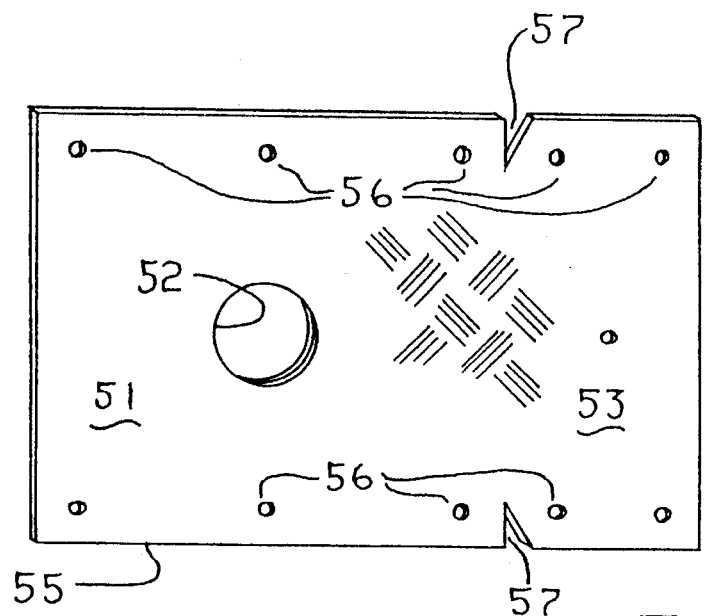
FIG. 8 is front view of a bracket for mounting the adaptor of this invention.
Figure 9:
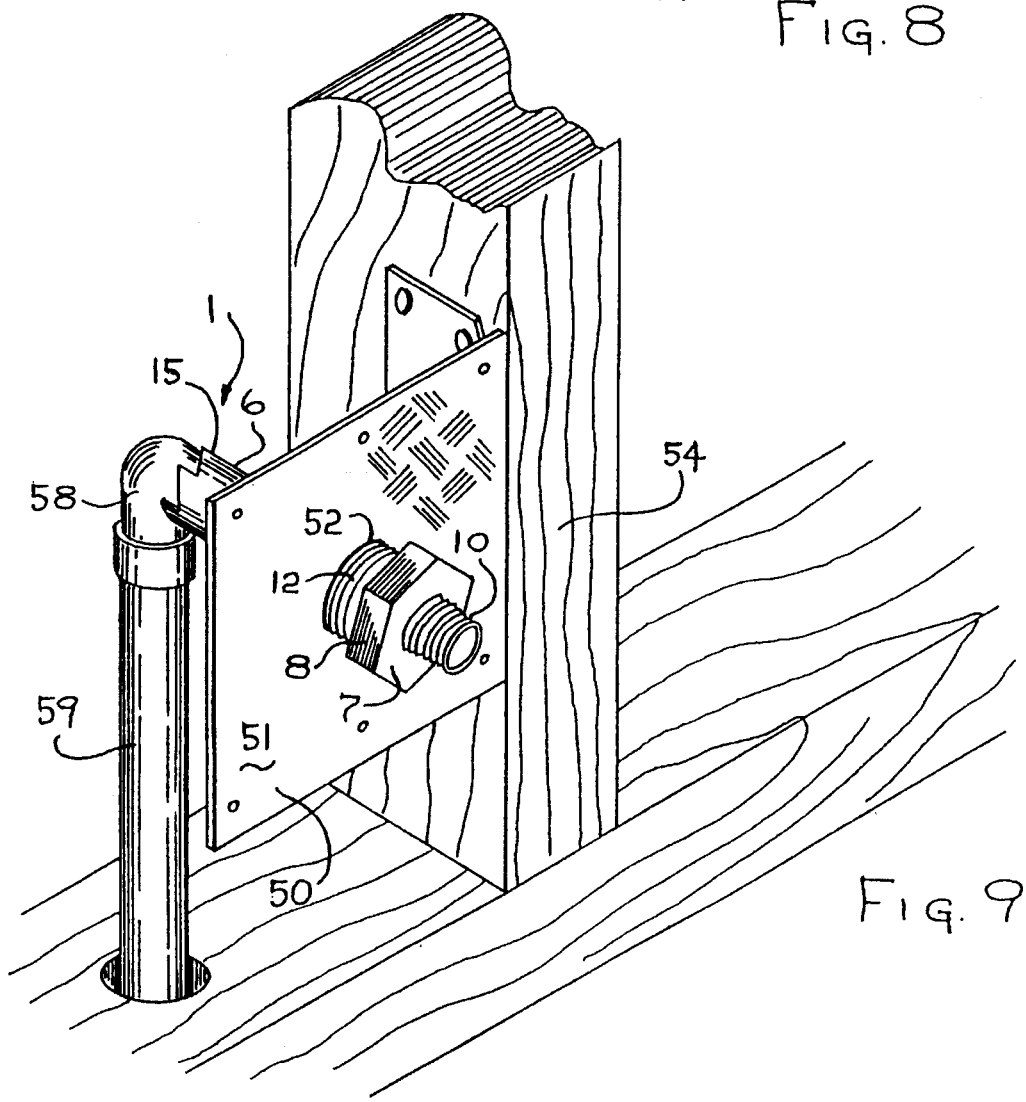
FIG. 9 is an isometric view of an adaptor of this invention mounted on the bracket of FIG. 8.

Referring now to FIGS. 8 and 9, the adaptor of this invention is also advantageously employed as a pipe connection and mounting means for non-barrier applications or in barrier applications prior to installation of the barrier. This is particularly useful for installation for plaster walls or the like. As shown in FIG. 9, for this purpose a bracket 50 is employed for mounting adaptor 1. Bracket 50 comprises a flange 51 bearing a central hole 52 having a diameter matching that of threaded section 12 of adaptor 1 so that terminal portion 15 of adaptor 1 may be inserted into hole 52 and then, upon rotation adaptor 1, threaded section 12 will be securely engaged in hole 52. Bracket 50 also is provided with appropriate means for securing it to a support, in this case a flange 53 at right angles to flange 51 which is secured to a wall stud 54 or other suitable upright.

As shown in FIG. 8, bracket 50 may be fabricated from a sheet metal blank 55 provided with nail holes 56. Notches 57 are provided to facilitate bending of blank 55 to adjust the angle between flanges 51 and 3 as desired.

When employed with bracket 50 for mounting in a wall application prior to installation of the wall, as shown in FIG. 9, threaded section 12 adaptor 1 may be only partially threaded through hole 52 so that flange 7 is spaced from flange 51 a distance equal to the thickness of the wall that will be installed. Jamb nut 14 is then secured at the inner side of flange 51 to further secure adaptor 1 in this position. Terminal portion 15 of pipe segment 6 can then be connected to service piping, such as elbow 58 and pipe 59 shown in FIG. 9.

Thus by practice of this invention a pipe may be extended through a barrier and secured therein more efficiently and with fewer operations. A hole for the pipe may be drilled and a pipe segment inserted in the hole and secured, all in a single continuous operation from only one side of the barrier.

We claim:

1. An adaptor for extending a pipe through a barrier and securing the pipe therein comprising a pipe segment with a leading end for insertion through the barrier and a trailing end that remains at the insertion side of the barrier upon insertion of the adaptor, each end being adapted for connection to a pipe fitting, and having:

a. a stop extending outward from the exterior of the pipe segment at a position therealong at a distance toward the trailing end from said leading end for engaging the surface of the barrier to stop penetration of said segment beyond said position, b. an externally threaded section extending along said segment in the direction of said leading end from said stop, the threads thereof being configured to engage the sides of the hole to draw the threaded section into the hole upon rotation of the adaptor about its longitudinal axis, and c. a plurality of cutting means at the periphery of the leading end, said cutting means being actuated by rotation of said adaptor about it longitudinal axis, for cutting a hole in said barrier of a size to receive the threaded section in self-threading relationship upon rotation of said adaptor about its longitudinal axis, to thereby engage the sides of the hole to draw the threaded section into the hole and secure the adaptor therein, upon further rotation of the adaptor.

2. An adaptor as in claim 1 and wherein said hole cutting means is configured to cut a hole at least about equal to the root diameter of the threaded section and no larger than about equal to the crest diameter of the threaded section.

3. An adaptor as in claim 2 and wherein said hole cutting means comprises cutting teeth disposed about the rim of the leading end of said adaptor.

4. An adaptor as in claim 3 and wherein said teeth are formed from the pipe wall at the leading end and project in the leading direction therefrom.

5. An adaptor as in claim 1 and wherein said stop comprises an annular flange.

6. An adaptor as in claim 5 and wherein the periphery of said annular flange is ridged for gripping by a tool for rotation of said pipe segment about its longitudinal axis for installation of said adaptor.

7. An adaptor as in claim 1 and wherein said pipe segment further comprises a leading section extending from the leading end towards the externally threaded section, said leading section having an external diameter about equal to or smaller than the root diameter of the threaded section.

\* \* \* \* \*